3,028,271
SOLID COMPOSITE ROCKET PROPELLANTS CONTAINING AMIDE EPOXIDE POLYMERS
Thomas F. Dixon, East Woodland Hills, Ernest J. Zeilberger, Sherman Oaks, and James H. Langworthy, Anaheim, Calif., assignors to North American Aviation, Inc.
No Drawing. Filed Aug. 24, 1956, Ser. No. 607,537
19 Claims. (Cl. 149—19)

This invention relates to a propellant composition. More particularly, this invention relates to a solid composition suitable for use as a rocket propellant.

Rocket motor propellants commonly comprise an oxygen carrier such as ammonium perchlorate bonded together with a plastic material. A difficulty arises in obtaining a suitable plastic binding material that will not lose its cohesive and binding quality during the burning of the propellant charge. If it cracks from the heat generated on burning, a greater surface is exposed to the flame, causing uneven burning and danger of explosion. Also, burning in the cracks may impair or damage the motor or container before completion of flight causing it to deviate from its predetermined flight path. Another problem is to get binding material which, upon combustion, does not form exhaust gases that corrode the metal motor parts. A sulfur containing material, for example, forms corrosive oxides of sulfur which attack motor parts.

It is therefore an object of the present invention to provide a rocket propellant having an improved plastic binder. Another object of this invention is to provide a propellant composition which has a high heat of combustion and also a high specific impulse. Another object is to provide a propellant composition which, upon burning, does not produce corrosive exhaust gases. It is also an object to provide a rocket propellant which, when cast in a rocket motor, firmly adheres to the walls of the motor casing. It is likewise an object of this invention to provide a propellant in which the unburned portion retains its cohesive quality and does not crack from the heat generated during the burning of the charge.

The above and other objects of this invention are accomplished by providing a combustible composition useful as a rocket propellant comprising (1) an amide-epoxy polymerized composition obtained by copolymerizing a polyamide of an organic polycarboxy compound with a glycidyl polyether derivative of a polyhydric organic compound having a terminal epoxy equivalency greater than 1.0, and (2) an inorganic perchlorate intimately distributed throughout said polymerized composition. For example, an amide epoxy polymerized composition is obtained by copolymerizing (a) 1 part of a polyamide obtained by reacting 1,3-dimethyl urea with dilinoleic acid dimer in a molar ratio of substantially 2:1, with (b) 1 part of diglycidyl ether of diethylene glycol. An example of a propellant comprises this composition containing intimately distributed throughout the polymer, substantially 300 weight percent of amomnium perchlorate based upon the amount of polymer.

The amide employed in the preparation of the polymer composition has active hydrogens attached to nitrogen atoms, that is, the polyamide of an organic polycarboxy compound has a plurality of active hydrogen-containing amino groups. Thus, in the above illustrative example, a greater than stoichiometric amount of urea was reacted with the dicarboxy organic acid. In this manner, polyamide molecules were produced having terminal urea molecule derivatives. Thus, there were active amino hydrogens at each end of the polyamide molecules available for later reaction with glycidyl polyether compounds.

The acids employed in making the polyamides are organic polycarboxy acids or compounds having from 2 to about 36 carbon atoms. Nonlimiting examples of such acids are the aliphatic saturated dicarboxylic acids such as oxalic acid, malonic acid, succinic acid, adipic acid, suberic acid, azelaic acid, cetylmalonic acid and dilicanic acid dimer. The acids may also be unsaturated aliphatic dicarboxy acids such as fumaric and maleic acids, allylmalonic acid and its derivatives, and dilinoleic acid dimer. The above constitute the preferred acids which are used either alone or in mixtures of two or more in the preparation of the propellant composition of this invention. Polycarboxylic aromatic acids also may be employed such as phthalic acid, 1,3,5-tricarboxybenzene, ethylphthalic acid, etc. The aromatic compounds, however, do not give compositions with as good performance characteristics.

The amines employed in preparing the propellant composition contain at least 2 amino groups which have at least 1 hydrogen attached to the nitrogen atom. There may be from 2 to about 5 nitrogen atoms in the molecule and from 1 to about 25 carbon atoms. Examples of amines include aliphatic polyamines, aromatic polyamines, and substitutedureas. When the amines are aliphatic polyamines, they can be aliphatic diamines as, for example, ethylenediamine, trimethylenediamine, tetramethylenediamine, hexamethylenediamine. The amines can also be aliphatic polyamines such as diethylenetriamine, triethylenetetramine, tetraethylenepentamine, and pentaethylenehexamine. Examples of aromatic polyamines that can be used are the phenylenediamines, 2,2-di-(4-aminophenyl) propane, etc. The substituted ureas that are employed have the general formula

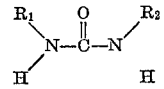

in which $R_1$ and $R_2$ can be the same or different and are hydrogens or hydrocarbon groups having from 1 to about 12 carbon atoms. In nomenclature, the nitrogen atoms in the urea are numbered 1 and 3 and the oxygen-bearing carbon atom between the nitrogens is numbered 2. The substituted ureas may be prepared by methods well known in the art such as the reaction of alkyl halides with amines. Such processes are discussed in various organic texts as for example in the Textbook of Organic Chemistry by Fieser and Fieser, 1950 Edition, published by D. C. Heath and Company, New York. Non-limiting examples of the ureas are urea, 1-methyl urea, 1-ethyl urea, 1-t-butyl urea, which illustrates monosubstituted ureas; and 1,3-dimethyl urea, 1,3-diethyl urea, 1-ethyl-3-propyl urea, 1-ethyl-3-pentyl urea, 1-propyl-3-cyclohexyl urea, 1,3-dioctyl urea, 1,3-didodecyl urea, 1,3-diphenyl urea, 1-methyl-3-phenyl urea, 1-methyl-3-naphthyl urea, etc., illustrative of disubstituted ureas. It is thus seen that the ureas may have from 1 to about 25 carbon atoms. The preferred ureas, however, are the 1-3-disubstituted ureas as they provide a more resilient propellant binder which does not shrink or crack during firing. The preferred ureas also contain from 3 to about 15 carbon atoms as no advantage is gained by going to a greater number of carbon atoms in the amines. Also, the ureas substituted with aliphatic groups are preferred as they give better burning characteristics in the finished propellant than when ureas substituted with aromatic groups are employed. Mixtures of 2 or more different amines can also be used in the preparation of polyamides.

The glycidyl polyether compounds which are employed in preparing the binder for the oxygen carrier of the propellant composition is prepared by reacting a polyhydric alcohol with an epihalohydrin, a halogen epoxy compound, in the presence of either a base or an acid. For example, the reaction of a mol of a dihydric phenol such as 2,2-bis(4-hydroxyphenyl) propane with one or more mols of epichlorohydrin in the presence of a base such as sodium hydroxide produces a glycidyl polyether having terminal epoxy groups. Similarly, 1,2,3-trihydroxypropane can be reacted with 1 or more mols of 1,2-epoxy-3-chlorohexane in the presence of acid catalyst such as borontrifluoride or its derivatives to produce a polyether compound having epoxy groups at each end of the molecules. These glycidyl ether compositions and method for their preparation are described in various technical publications. Various patents also refer to these compounds and to their preparation. Among the patents, for example, are the Castan Patents 2,324,483 and 2,344,333. The product that is obtained when epichlorohydrin is one of the reactants may be represented by the formula

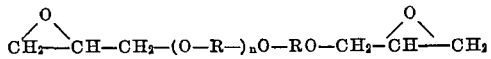

wherein R represents a divalent hydrocarbon of a polyhydric alcohol such as that of a dihydric phenol or glycol, and $n$ is an integer of the series 0, 1, 2, 3, etc. The length of the molecule depends on the proportion of epichlorohydrin to polyhydric alcohol used. In general, these glycidyl ethers have an epoxy equivalency greater than 1.0 and contain terminal 1,2-epoxy groups. By the epoxy equivalency is meant the number of 1,2-epoxy groups contained in the average molecule of the glycidyl ether. Since the measured molecular weight of the mixture, upon which the epoxy equivalency is dependent, is the average molecular weight, the epoxy equivalency will not necessarily be 2.0 but will be between 1.0 and 2.0.

When the polyhydric alcohols employed in the preparation of the glycidyl polyethers are dihydric phenols they can be one or more phenols having from 1 to about 2 aromatic nuclei in the molecule such as resorcinol, catechol, hydroquinone, ethyl resorcinol, 2,2-bis(4-hydroxyphenyl) propane, bis(4-hydroxyphenyl)methane, 2,2-bis(4-hydroxyphenyl)butane, 1,5-dihydroxynaphthalene, etc. When the polyhydric alcohols employed are nonaromatic, they can be alcohols having from 2 to about 20 carbon atoms and from 2 to 3 hydroxy groups. Nonlimiting examples of such alcohols are 1,2-dihydroxyethane, 1,2,3-trihydroxypropane, 1,8-dihydroxyoctane, 1,3,5-trihydroxydodecane, 1,2-dihydroxyeicosane. Another class of hydroxy compounds that can be used consists of polyether glycols such as diethylene glycol, triethylene glycol, hexaethylene glycol, etc. When preparing the glycidyl polyether compounds, one or a mixture of two or more alcohols can be employed. It is preferred, however, to use the aliphatic compounds which give compositions having better combustion characteristics. It will be noted that the number of carbon atoms in the polyhydroxy compounds used varies from 2 to about 20. The preferred polyhydroxides used, however, are those having from 2 to about 12 carbon atoms and 2 hydroxy groups, as compositions prepared from such alcohols have better cohesive qualities.

Examples of epihalohydrins employed in the preparation of the polyether compounds are 1,2-epoxy-3-chloropropane, 1,2-epoxy-4-chlorobutane, 1,2-epoxy-8-bromooctane, 2,3-epoxy-5-chlorododecane, 5,6-epoxy-7-bromoeicosane. Of these the 1,2-epoxy-3-halopropanes such as 1,2-epoxy-3-chloropropane gives very good results and its use constitutes a preferred embodiment in the instant invention. A method for the preparation of epihalohydrins is given in Organic Syntheses by Gilman, volume I, 2nd Edition, John Wiley and Sons, Inc., New York.

The perchlorates which are employed have the general formula $$M(ClO_4)_x$$

in which M is selected from the group consisting of $NH_4$ and a metal, and $x$ represents the valency of M. The metal can be one of the metals of groups I-A, I-B, II-A, III-A, IV-A and VIII of the periodic table of elements. For example, the perchlorates can be the alkaline metal perchlorates such as lithium perchlorate, sodium perchlorate, potassium perchlorate, cesium perchlorate. Other perchlorates include such compounds as magnesium perchlorate having the formula $Mg(ClO_4)_2$, calcium perchlorate, barium perchlorate, iron perchlorate, silver perchlorate, thallium perchlorate. The ammonium perchlorate is preferred, however, since it forms gaseous products only on combustion.

The polyamide used in this invention is prepared by reacting a polycarboxy acid, or partially esterified derivative thereof, with a polyamine, as for example a substituted urea, in a suitable reaction vessel. Heat is applied and the temperature slowly increases to about 150° C. or more until the reaction is substantially complete. An alternative method is the slow addition of the polyamine to the polycarboxylic acid compound while heating the latter. This alternate method is preferred where excessive foaming occurs upon the reaction of the amine with the acid.

An embodiment of this invention comprises a propellant in which the binder for the oxygen carrier is a copolymer of a polyester-polyamide and a terminal-epoxy-containing organic polyether compound. In this variation the polyester-polyamide, which replaces the polyamide, is obtained by reacting a polyamine with a partially esterified polybasic acid, for example, sebacic acid is reacted with polyethylene glycol having an average molecular weight of 400 in the molar ratio of 2:1 respectively, in the presence of zinc chloride as a catalyst. This partially esterified sebacic acid is then reacted with a polyamine such as 1,3-dimethyl urea, to produce the polyester polyamide. The latter compound is then reacted with a terminal-epoxy-containing organic polyether such as the diglycidyl ether of diethyleneglycol, together with an oxygen carrier, as for example lead perchlorate, to produce a solid propellant. The alcohol used to partially esterify the polybasic acid is preferably a glycol which can be a polyetherglycol and can have from 2 to about 40 carbon atoms and from 2 to about 22 oxygen atoms. The alcohol can be a mixture of polyhydric alcohols such as a mixture of different polyethylene glycols so that the average molecular weight can vary from 62 to about 400.

Thus, the propellant of this invention consists of a combustible composition useful as a rocket propellant comprising (1) an amide-epoxy polymerized composition obtained by copolymerizing a polyamide obtained by reacting an organic polycarboxylic acid having from 2 to about 36 carbon atoms with an organic polyamine having from 1 to about 25 carbon atoms and from 2 to about 5 nitrogen atoms, with a glycidyl polyether derivative of a polyhydric organic compound having a terminal epoxy equivalency of between 1.0 and 2.0, and (2) an inorganic perchlorate intimately distributed throughout said polymerized composition, said perchlorate having the general formula $$M(ClO_4)_x$$

wherein M is selected from the group consisting of $NH_4$ and a metal, and $x$ represents the valency of M. When the glycidyl polyether employed is a diglycidyl ether as, for example, the diglycidyl ether of triethylene glycol, the epoxy equivalency of the glycidyl ether is 2.0 since all the molecules have the same molecular weight. When, however, a mixture of two or more different glycidyl ethers is used the epoxy equivalency which depends on the average molecular weight will therefore not be 2.0 but will have a value of between 1.0 and 2.0.

The amount of amine employed is such as to provide terminal amino groups on the polyamide for reaction with the diglycidyl ethers. When the acid employed in making the polyamide is first partially esterified with an alcohol, a fraction of the carboxy groups is thus made unavailable for amide formation. Hence the ratio of amine to acid employed in the preparation of a polyamide such as polyester polyamide can be as low as 1 since after partial esterification there will be a diminution of the number of carboxy groups with the result that a greater than equivalent amount of amino groups will be present in the reaction mixture. The polyamide will have terminal amino groups available for subsequent reaction with a diglycidyl ether.

When a polyester is used in the preparation of the composition of this invention, it is generally made by reacting a polycarboxy acid with the required alcohol at reflux temperatures for a length of time sufficient to cause a formation of a polyester compound. The water by-product which is formed in the reaction is removed by distillation. An example of a polyester preparation is the reaction of sebacic acid with triethylene glycol by refluxing the two for a period of up to 15 hours and removing the water by-product by distillation.

The preparation of the propellant compositions of this invention consists in general of mixing the polyamide and the terminal epoxy containing organic polyether compounds, followed by the addition of the oxygen carrier. The mixture is then thoroughly mixed, stirred or agitated until a homogeneous composition results. The latter is then fed into the rocket motor casing. The rocket motor casing may be contained in the vacuum chamber in which case the propellant is vacuum cast so that no air is trapped in the propellant charge. The propellant charge may also be cast under atmospheric pressure in which case it is necessary to take precautions that the charge is well tamped with the aid of vibration, etc. in order to minimize the inclusion of air in the charge. After the composition has been cast, the polyamide glycidyl polyether binder is allowed to cure. The curing is effected at temperatures ranging from about 20° C. to about 90° C. Temperatures of from 20° C. to about 70° C. are preferred to minimize the hazard of decomposition of the oxygen carrier. Temperatures below 20° C. can also be employed. During the casting of the charge a mandrel coated with a mold release such as a silicone compound or Teflon is positioned in the center of the rocket chamber. After the curing of the resin binder, this mandrel is removed, leaving a firing area or surface within the chamber. In rocket motors in which the charge burns at the end adjacent the exhaust port, there is no firing chamber located longitudinally along the axis of the rocket charge and hence there is no mandrel employed when charging the motor.

The following examples will more clearly illustrate the method of preparation of the propellant compositions of this invention.

Example I

To a reaction vessel equipped with heating and cooling means, means for agitation, means for refluxing liquids, and means for distillation was added 19 parts of 1,3-dimethyl urea and 56 parts of dilinoleic acid dimer which is obtained by dimerizing linoleic acid at elevated temperature. The components were heated to a temperature of 149° C. for a period of 24 hours. The water by-product of the reaction was removed by distillation. The viscosity of the polyamide thus formed was 68,000 centipoises at 66° C. To the polyamide was then added, at a temperature of 60° C., 74 parts of diglycidyl ether of triethylene glycol prepared by reacting 1,2-epoxy-3-chloropropane with triethylene glycol in the molar ratio 2:1 respectively, in the presence of sodium hydroxide. While keeping the mixture in agitation, 222 parts of ammonium perchlorate containing 1 wt. percent of ferric oxide burning catalyst was added. The mixture was agitated for a period of about 15 minutes while maintaining the temperature at substantially 60° C. Next, the propellant mixture was transferred to a casting vessel equipped with heating means and means for feeding the propellant in ribbon form into the desired mold, such as a rocket motor. The casting vessel was connected to a vacuum vessel adapted to hold the mold or rocket motor and also equipped with means for agitating the rocket motor or mold. A rocket motor casing with a Teflon-coated mandrel inserted through the exhaust chamber at the rear end of the vessel and positioned longitudinally along the axis of the motor, was placed in the vacuum chamber. The open front end of the rocket motor was placed beneath the ribbon-forming feeder means of the casting vessel. The air was next withdrawn from the vacuum vessel causing the propellant mixture to be fed from the casting vessel through the ribbon-forming feeder means into the rocket motor casing. During this operation, the casting vessel was maintained at a temperature of substantially 60° C. The rocket motor casing was maintained in constant vibration by the agitating means in the vacuum vessel in order to settle the propellant charge being fed into the casing so as to completely fill the latter. When the rocket motor casing was filled with the propellant mixture which at this point had a viscosity of substantially 80,000 to 200,000 centipoises at a temperature of substantially 60° C., the closure cap was affixed to the front end of the rocket motor. The charged rocket motor was then subjected to a temperature of substantially 70° C. for a period of 10 hours. At the end of this time the charge had set so that the oxygen carrier particles of ammonium perchlorate were firmly held together by the polyamide-glycidylpolyether copolymer. The propellant charge had a firm but resilient texture and had a high cohesive quality. The charge adhered well to the wall of the rocket motor casing. The Teflon-coated mandrel was withdrawn through the exhaust nozzle leaving a firing chamber longitudinally disposed along the axis of the rocket motor.

Several small cylindrical molds, six inches in length and 2 inches in diameter, were likewise filled by the procedure of Example 1, to provide specimens for various testing procedures.

The molar ratio of amine-to-acid used in Example 1 was substantially 2.1:1.

Equally good results are obtained when the procedure of Example I is repeated using 26 parts of 1,3-dimethyl urea instead of 19 parts so that the molar ratio of amine-to-acid was 3:1.

Example II

The procedure of Example I was followed in preparing a rocket propellant from a mixture of 1 part of the polyamide of Example I, 5 parts of a diglycidyl ether of 1,2,3-trihydroxy propane obtained by reacting epichlorohydrin with 1,2,3-trihydroxy propane in the molar ratio of 2-to-1, respectively, and 14 parts of sodium perchlorate.

Example III

Following the procedure of Example I, a polyamide was prepared by reacting 14 parts of 1,3-dimethyl urea, 10 parts of bis(4-aminophenyl)methane, and 56 parts of dilinoleic acid dimer, having the general formula $C_{34}H_{62}(COOH)_2$. In this case, the amines were premixed and slowly added in small increments to the acid which was maintained at a temperature of substantially 177° C. over a period of 15 hours. The water by-product was removed by distillation. The viscosity of the polyamide was 30,500 centipoises at a temperature of 18° C. and 4400 centipoises at a temperature of 66° C. One part of the polyamide was mixed with 1 part of diglycidyl ether of triethylene glycol and 6 parts of ammonium perchlorate containing 1 wt. percent of ferric oxide and the mixture cast into a motor as in Example I. The ammonium perchlorate used in this instance was a mixture of 70 wt. percent ground perchlorate having a particle size in the range of 0.1 to 30 microns in diameter, and 30 wt. percent of unground perchlorate having a particle size within the range of from about 50 to about 200 microns in diameter.

Example IV

The procedure of Example III was followed employing 5 parts of the polyamide of Example III, 1 part of diglycidyl ether of 1,2,3-trihydroxy propane, 1 part of castor oil and 28 parts of potassium perchlorate containing 5 wt. percent of ferric oxide burning catalyst.

Example V

A polyester was prepared by refluxing 20 parts of sebacic acid with 20 parts of polyethylene glycol having an average molecular weight of 400, together with 0.5 wt. percent of zinc chloride as a catalyst. The refluxing was continued for a period of 15 hours under a nitrogen atmosphere at the end of which time the water by-product was removed by distillation. To the sebacic acid polyester thus formed was added 19 parts of 1,3-dimethyl urea and the mixture maintained at reflux temperature for a period of 15 hours. The water by-product was removed by distillation leaving a polyester polyamide which had a viscosity of 100,000 centipoises at 18° C. and 43,000 centipoises at 66° C. Following the procedure of Example I, 1 part of this polyester polyamide was mixed with 1 part of diglycidyl ether of triethylene glycol used in Example I, with 7.5 parts of ammonium perchlorate containing 0.1 wt. percent ferric oxide and the mixture charged to a rocket motor and cured.

Example VI

A polyamide is prepared by reacting 25 parts of 1-hexyl-3-octylurea with 9 parts of oxalic acid as in Example I. Nine parts of this polyamide is mixed with 3 parts of a polyether compound prepared by reacting 1,2-epoxy-3-bromohexane with ethylene glycol in the molar ratio of 2-to-1, respectively, 0.01 part of tricresylphosphate plasticizer and 8 parts of calciumperchlorate containing 1.0 wt. percent of MgO burning catalyst. The rocket motor is charged with this composition, as in Example I. The molecular ratio of amine-to-acid in the polyamide in this propellant is 1.5:1. The ratio in parts by weight of polyamide-to-epoxy compound is 3:1.

The use of unsubstituted urea in the process of Example VI also produces a propellant composition.

Example VII

A mixture of 37 parts azelaic acid, 12 parts of 1,3-dimethyl glycol was refluxed for a period of 4 hours at 150° C. under a nitrogen atmosphere. To 1 part of the polyester polyamide thus formed was added 1 part of diglycidyl ether of triethylene glycol used in Example I and 8 parts (80%) of ammonium perchlorate having a particle size of from 0.1 to about 200 microns in diameter. This propellant mixture was cast into a rocket motor as in Example I.

Example VIII

A polyamide is prepared by reacting 1,3-didodecyl urea with cetyl malonic acid in the molar ratio of 1.5-to-1.0 respectively. Fourteen parts of this polyamide is mixed with seven parts of a glycidyl ether prepared by reacting 1,2-epoxy-3-bromo-dodecane with 1,2-dihydroxy eicosane in the molar ratio of 2-to-1 respectively, 1 part of acetyl triethylene citrate as a plasticizer, and 33 parts of barium perchlorate containing 2 wt. percent of silica burning catalyst. The propellant mixture thus obtained is charged to a rocket motor and cured.

Example IX

A mixture of 20 parts of sebacic acid and 20 parts of polyethylene glycol having an average molecular weight of 400, was refluxed for a period of 15 hours under a nitrogen atmosphere. The water by-product was removed by distillation. The polyester thus formed was added in small increments to 40 parts of tetraethylene pentamine while maintaining the reactants at reflux conditions. The water by-product was removed by distillation leaving a polyester polyamide having a viscosity of substantially 44,500 centipoises at 18° C. One part of this polyester polyamide was mixed with 1 part of the diglycidyl ether of triethylene glycol used in Example I, together with 2 parts of ammonium perchlorate containing 1 wt. percent of ferric oxide and a rocket motor discharged as in Example I.

Example X

One part of a polyamide, prepared by reacting ethylene diamine with sebacic acid in a molecular ratio of 2-to-1, respectively, is mixed with 3 parts of a diglycidyl polyether obtained by reacting 1,2-epoxy-3-chloropropane with hexaethylene glycol in a molar ratio of 2-to-1, respectively, 0.4 part of di-2-ethylhexyl phthalate, and 7 parts of cobaltperchlorate containing 5 wt. percent of chromic oxide burning catalyst. The mixture is cast in a rocket motor casing and cured to form a propellant.

Example XI

A polyester was prepared by refluxing 15 parts of triethylene glycol with 37 parts azelaic acid in the presence of 0.5 weight percent zinc chloride catalyst based on the amount of acid for a period of 4 hours, at a temperature of 150° C., and water removed by distillation. The polyester thus formed was added in small increments to a mixture of 10 parts of diethylene triamine, and 9 parts of 1,3-dimethyl urea, at a reflux temperature while maintaining the reactants under a nitrogen atmosphere. The water was removed by distillation leaving a polyester polyamide having a viscosity greater than 100,000 at 18° C. and 13,000 centipoises at 66° C. A rocket propellant composition is prepared by mixing 3.5 parts of this polyester polyamide with 3.5 parts of diglycidyl ether of triethylene glycol used in Example I, together with 17 parts of ammonium perchlorate containing 3 wt. percent of Al burning catalyst.

Example XII

The procedure of Example XI was repeated with the modification that the amounts of diethylene triamine and azelaic acid employed were reduced by a factor of 2. No catalyst was used in the preparation of the polyester.

Example XIII

A rocket propellant composition is prepared by mixing 9 parts of a polyamide obtained by reacting hexamethylene diamine with sebacic acid in the molar ratio of 3-to-1, respectively, 6 parts of a glycidylpolyether obtained by reacting epichlorohydrin with 1,3,8-trihydroxyoctane in the molar ratio of 2-to-1, respectively, 2 parts of allyl glycidyl ether and 25 parts of thallium perchlorate. This mixture is subjected to curing temperature of substantially 20° C.

Example XIV

The procedure of Example XI is repeated with the modification that 7 parts of a glycidyl polyether prepared by reacting epichlorohydrin with 2,2-bis(4-hydroxyphenyl)-propane in the molar ratio of 2-to-1, respectively, is used in place of the diglycidyl ether of triethylene glycol. Also, barium perchlorate is substituted for ammonium perchlorate.

From the above examples, it is seen that in the preparation of the polyamide the molar ratio of amine-to-acid can vary from 3:1 to 1:1. It is also seen that the ratio in parts by weight of polyamide-to-epoxy polyether compounds can vary from 1:15 to 5:1. It is also seen that when a polyester is employed, the molar ratio of acid-to-alcohol employed in the preparation of the polyester varies from 2:1 to 1:1. However, since the acid can be employed without esterification, the maximum value of the ratio is not limiting.

The amount of burning catalyst that can be employed, based on the weight of perchlorate used, can vary from 0.1 wt. percent to about 5 weight percent, preferably 1 to 3 weight percent. The catalyst can be one or more of the compounds commonly used for this purpose and includes the metals iron, cobalt, nickel, chromium, copper, aluminum, magnesium, and their oxides as well as silica and compounds of silicon.

As indicated in the examples, plasticizers may be used in the preparation of the propellants of this invention in amounts of from about 1 to about 15 weight percent based on the amount of polyamide and glycidyl ether compounds employed. The plasticizers have the effect of prolonging the pot life of the polyamide glycidyl ether mixtures so that there is less danger of the material setting up prior to casting in a rocket or other mold. The plasticizer also serves to reduce the viscosity of the composition prior to curing. Nonlimiting examples of plasticizers that can be used are tricresyl phosphate, esters of organic acids such as di(2-ethylhexyl)adipate, polyhydric alcohols such as ethylene glycol and glycerin, ether substituted esters such as butoxy ethyl acrylate, ester substituted esters such as acetyl tributyl citrate, epoxy compound such as allyl glycidyl ether, etc. Other plasticizers will readily suggest themselves to one skilled in the art.

The amount of oxygen carrier, namely, the ammonium and/or metal perchlorate, used, can vary from about 50 weight percent to about 90 weight percent, based on the total amount of perchlorate and binder in the propellant composition. It is preferred, however, that the propellant contain from 70 to about 85 weight percent perchlorate in order to give maximum specific impulse, that is, the greatest thrust per unit weight of propellant.

The propellant compositions of this invention have viscosity substantially in the range of from 80,000 to about 200,000 centipoises at a temperature of substantially 60° C. The curing time at temperatures of 20° C. to about 90° C. varies from 1 to about 14 hours.

The cured propellant has the advantage of good adherence to the wall of the propellant casing. This is important in order to prevent burning of the propellant between the wall and the charge which often causes failure of the rocket. Another advantage that the propellant composition of this invention has is that it retains its elasticity throughout the firing so that the charge does not crack from the heat generated at the burning surface. This also is important since cracking of the charge results in nonuniform burning because of the greater surface area being exposed to the flame. This enhances the danger of explosion and failure. Another advantage of the composition is that all of the components of the binder oxidize to noncorrosive gases so that the metal parts of the exhaust chamber are not damaged. Still another advantage is the high specific impulse obtained by the use of the compositions of this invention as a rocket propellant. This makes it possible to obtain longer ranges with the same amount of propellant.

The burning rate of the propellants of this invention was determined by observing the depth to which the propellant was burning away upon igniting the surface and allowing it to burn for a specified period of time. The propellant of Example I burns at the rate of about 0.286 inch per second. The same composition with 1% iron oxide added burns at the rate of substantially 0.511 inch per second. The use of greater amounts of burning catalyst increase the burning rate to a greater degree. Comparable results are obtained with the use of the other burning rate catalysts when employed in the amount of from 0.5 to about 5%.

One manner of testing consists of fixing the rocket motor to an anchored stand so as to keep the rocket stationary during the firing. The rocket is then ignited by lighting a fuse connected to a pyrotechnic composition placed in the firing chamber of the rocket. The pyrotechnic composition is composed of such material as black powder or a mixture of ammonium perchlorate and powder metal such as aluminum, iron, magnesium, etc. The pressure generated within the firing chamber of the rocket is measured by means of a pressure pick-up. The thrust is measured by directing the exhaust from the motor into a thrust cell which contains a strain gage adapted to indicate the magnitude of the thrust on an oscillograph to which it is connected. The rocket propellant composition of this invention, when tested in motors by this procedure, all give good results with respect to the combustion chamber pressure and thrust.

Rocket motors charged with the composition of this invention give good performance with respect to flight and range on firing.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A combustible composition useful as a rocket propellant consisting essentially of (1) an amide-epoxy polymerized composition obtained by copolymerizing dilinoleic acid dimer with 1,3-dimethyl urea in amounts such that the molar ratio of urea-to-acid is from about 3:1 to about 1.5:1; with a glycidyl polyether obtained by copolymerizing triethylene glycol with 1,2-epoxy-3-chloropropane in amounts such that the molar ratio of epoxy compound-to-glycol is substantially 2:1, wherein the ratio in parts by weight of said amide-to-said glycidyl polyether compound is from about 1:5 to about 5:1, and (2) from about 50 weight percent to about 90 weight percent, based on the total weight of said rocket propellant, of ammonium perchlorate intimately distributed throughout said polymerized composition.

2. A combustible composition useful as a rocket propellant consisting essentially of (1) an amide-epoxy polymerized composition obtained by copolymerizing dilinoleic acid with 1,3-dimethyl urea in amounts such that the molar ratio of urea-to-acid is substantially 2.1:1 with a glycidyl polyether obtained by copolymerizing triethylene glycol with 1,2-epoxy-3-chloropropane in amounts such that the molar ratio of epoxy compound-to-glycol is substantially 2:1, and wherein the ratio in parts by weight of said amide-to-said glycidal polyether compound is from about 1:5 to about 5:1 and (2) about 75 wt. percent based on the total weight of said propellant, of ammonium perchlorate intimately distributed throughout said polymerized composition.

3. The composition of claim 2 containing, in addition, 1–5 weight percent, based on the weight of said perchlorate, of ferric oxide as a burning catalyst.

4. A combustible composition useful as a rocket propellent consisting essentially of (1) an amide glycidyl polyether polymerized composition obtained by copolymerizing a polyamide with a glycidyl polyether compound; said polyamide being obtained by reacting an organic acid having from 2 to about 3 carboxy groups and from 2 to about 36 carbon atoms selected from the class consisting of oxalic acid, polycarboxylic aliphatic acids, polycarboxylic acids of benzene, and polycarboxylic acids of lower alkyl benzenes, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenylpolyamines, and substituted ureas having the general formula

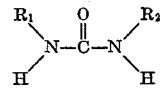

wherein $R_1$ and $R_2$ are selected from the class consisting of hydrogen and hydrocarbon groups having from 1 to about 12 carbon atoms; said glycidyl polyether compound being obtained by the interaction of an epihalohydrin having from 3 to about 20 carbon atoms with a polyhydroxy substituted compound having from 2 to about 20 carbon atoms and from 2 to 3 hydroxy groups selected from the class consisting of polyhydroxy aromatic hydrocarbons having from 1 to 2 six-membered carbon rings in the aromatic nucleus, polyhydroxy phenylalkyl compounds, polyhydroxy substituted saturated aliphatic hydrocarbons, and polyhydroxy substituted saturated aliphatic ether compound, said glycidyl polyether compound having a terminal epoxy equivalency of between 1.0 and 2.0; wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymeriezd composition, said perchlorate having the general formula $$M(ClO_4)_x$$

wherein M is selected from the group consisting of $NH_4$ and a metal of groups I–A, I–B, II–A, III–A, IV–A and VIII, and $x$ represents the valency of M.

5. A combustible composition useful as a rocket propellant consisting essentially of (1) an amide-glycidyl polyether polymerized composition obtained by copolymerizing a polyamide with a glycidyl polyether compound; said polyamide being obtained by reacting a polycarboxylic aliphatic acid having from 2 to about 3 carboxy groups and from 2 to about 36 carbon atoms, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenylpolyamines, and substituted ureas having the general formula

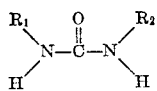

wherein $R_1$ and $R_2$ are selected from the class consisting of hydrogen and hydrocarbon groups having from 1 to about 12 carbon atoms, and wherein the molar ratio of amine-to-acid is from about 3:1 to about 1:1; said glycidyl polyether compound being obtained by the interaction of epichlorohydrin with a hydroxy substituted saturated aliphatic ether compound having from 2 to about 20 carbon atoms and from 2 to 3 hydroxy groups, said glycidyl polyether compound having a terminal epoxy equivalency of between 1.0 and 2.0; and wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymerized composition, said perchlorate having the general formula $$M(ClO_4)_x$$

wherein M is selected from the group consisting of $NH_4$ and a metal of groups I–A, I–B, II–A, III–A, IV–A and VIII, and $x$ represents the valency of M.

6. A combustible composition useful as a rocket propellant consisting essentially of (1) an amide-glycidyl polyether polymerized composition obtained by copolymerizing a polyamide with a glycidyl polyether compound; said polyamide being obtained by reacting a dicarboxylic aliphatic acid having from 2 to about 36 carbon atoms, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenylpolyamines, and substituted ureas having the general formula

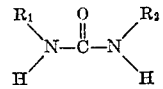

wherein $R_1$ and $R_2$ are selected from the class consisting of hydrogen and hydrocarbon groups having from 1 to about 12 carbon atoms; and wherein the molar ratio of amine-to-acid is from 3:1 to about 1:1; said glycidyl polyether compound being obtained by the interaction of epichlorohydrin with a dihydroxy saturated aliphatic ether compound having from 2 to about 20 carbon atoms, said glycidyl polyether compound having a terminal epoxy equivalency of between 1.0 and 2.0; and wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymerized composition, said perchlorate having the general formula $$M(ClO_4)_x$$

wherein M is selected from the group consisting of $NH_4$ and a metal of groups I–A, I–B, II–A, III–A, IV–A, and VIII, and $x$ represents the valency of M.

7. The composition of claim 6 wherein said organic polyamine has from 1 to about 15 carbon atoms and from 2 to about 5 nitrogen atoms.

8. A combustible composition useful as a rocket propellant consisting essentially of (1) an amide-glycidyl polyether polymerized composition obtained by copolymerizing a polyamide with a glycidyl polyether compound; said polyamide being obtained by reacting an aliphatic dicarboxylic acid having from 2 to about 36 carbon atoms with a urea having the general formula

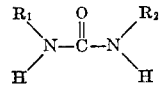

wherein $R_1$ and $R_2$ are selected from the class consisting of hydrogen and hydrocarbon groups having from 1 to 12 carbon atoms, and wherein the total number of carbon atoms in the urea is from 1 to about 15, the molar ratio an amine-to-acid being from 3:1 to about 1:1; said glycidyl poleyther compound being obtained by the interaction of epichlorohydrin with a dihydroxy aliphatic ether compound having from 2 to about 20 carbon atoms, said glycidyl polyether compound having a terminal epoxy equivalency of 1.0 to 2.0, and wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymerized composition, said perchlorate having the general formula $$M(ClO_4)_x$$

wherein M is selected from the group consisting of $NH_4$ and a metal taken from groups I–A, I–B, II–A, III–A, IV–A and VIII of the periodic table of elements, and wherein $x$ represents the valency of M.

9. A combustible composition useful as a rocket propellant consisting essentially of (1) an amide-glycidyl polyether polymerized composition obtained by copolymerizing a polyamide with a glycidyl polyether compound; said polyamide being obtained by reacting a polycarboxylic aliphatic acid having from 2 to about 3 carboxy groups and from 2 to about 36 carbon atoms, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenyl-polyamines, and substituted ureas having the general formula

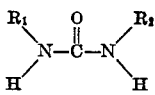

wherein $R_1$ and $R_2$ are selected from the class consisting of hydrogen and hydrocarbon groups having from 1 to about 12 carbon atoms, and wherein the molar ratio of amine-to-acid is from about 3:1 to about 1:1; said glycidyl polyether compound being obtained by the interaction of 1,2-epoxy-3-chloropropane, with a polyhydroxy substituted saturated aliphatic hydrocarbon containing from 2 to 3 hydroxy groups and from 2 to about 12 carbon atoms, said glycidyl polyether compound having a terminal epoxy equivalency of between 1.0 and 2.0; and wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymerized composition, said perchlorate having the general formula $$M(ClO_4)_x$$

wherein M is selected from the group consisting of $NH_4$ and a metal of groups I-A, I-B, II-A, III-A, IV-A and VIII, and $x$ represents the valency of M.

10. A combustible composition useful as a rocket propellant consisting essentially of (1) an amide-glycidyl polyether polymerized composition obtained by copolymerizing a polyamide with a glycidyl polyether compound; said polyamide being obtained by reacting a polycarboxylic aliphatic acid having from 2 to about 3 carboxy groups and from 2 to about 36 carbon atoms, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenylpolyamines, and substituted ureas having the general formula

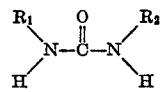

wherein $R_1$ and $R_2$ are selected from the class consisting of hydrogen and hydrocarbon groups having from 1 to about 12 carbon atoms, and wherein the molar ratio of amine-to-acid is from about 3:1 to about 1:1; said glycidyl polyether compound being obtained by the interaction of 1,2-epoxy-3-chloropropane, with 1,2,3-trihydroxypropane, said glycidyl polyether compound having a terminal epoxy equivalency of between 1.0 and 2.0; and wherein the ratio in parts by weight of said polyamide-to-said glycidyl polyether compound is from about 1:5 to about 5:1, and (2) from about 50 to about 90 weight percent based on the total weight of said propellant of an inorganic perchlorate substantially uniformly distributed throughout said polymerized composition, said perchlorate having the general formula $$M(ClO_4)_x$$

wherein M is selected from the group consisting of $NH_4$ and a metal of groups I-A, I-B, II-A, III-A, IV-A and VIII, and $x$ represents the valency of M.

11. A combustible composition useful as a rocket propellant consisting essentially of (1) an amide-glycidyl polyether polymerized composition obtained by copolymerizing a polyamide with a glycidyl polyether compound; said polyamide being obtained by reacting a partially esterified organic acid, said acid having from 2 to about 3 carboxy groups and from 2 to about 36 carbon atoms selected from the class consisting of oxalic acid, polycarboxylic aliphatic acids, polycarboxylic acids of benzene, and polycarboxylic acids of lower alkyl benzenes, said acid being partially esterified with a polyethylene glycol having an average molecular weight of from about 62 to about 400, said partially esterified acid being reacted with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, combined alkylphenylpolyamines, and substituted ureas having the general formula

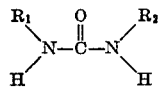

wherein $R_1$ and $R_2$ are selected from the class consisting of hydrogen and hydrocarbon groups having from 1 to about 12 carbon atoms and wherein the molar ratio of amine-to-acid is from about 3:1 to about 1:1; said glycidyl polyether compound being obtained by the interaction of an epihalohydrin having from 3 to about 20 carbon atoms with a polyhydroxy substituted compound having from 2 to about 20 carbon atoms and from 2 to 3 hydroxy groups selected from the class consisting of polyhydroxy aromatic hydrocarbons having from 1 to 2 six-membered carbon rings in the aromatic nucleus, polyhydroxy phenylalkyl compounds, polyhydroxy substituted saturated aliphatic hydrocarbons, and polyhydroxy substituted saturated aliphatic ether compound, said glycidyl polyether compound having a terminal epoxy equivalency of between 1.0 and 2.0; and wherein the ratio in parts by weight of said polyamide-to-said glycidyl polyether compound is from about 1:5 to about 5:1, and (2) from about 50 to about 90 weight percent, based on the total weight of said propellant, of an inorganic perchlorate substantially uniformly distributed throughout said polymerized composition, said perchlorate having the general formula $$M(ClO_4)_x$$

wherein M is selected from the group consisting of $NH_4$ and a metal of groups I-A, II-A, III-A, IV-A and VIII, and $x$ represents the valency of M.

12. A combustible composition useful as a rocket propellant consisting essentially of (1) an amide-glycidyl polyether polymerized composition obtained by copolymerizing a polyamide with a glycidyl polyether compound; said polyamide being obtained by reacting sebacic acid which has been partially esterified with polyethylene glycol having a molecular weight of about 400, with 1,3-dimethyl urea, wherein the ratio of said sebacic acid to said polyethylene glycol in parts by weight is substantially 1:1, and wherein the molar ratio of said esterified acid to said urea is substantially 1:2, said glycidyl polyether compound being obtained by the interaction of epichlorohydrin with triethylene glycol wherein the molar ratio of epichlorohydrin to triethylene glycol is about 2:1; and wherein the ratio in parts by weight of said polyamide-to-said glycidyl polyether compound is about 1:1, and (2) from about 50 to about 90 weight percent, based on the total weight of said propellant, of ammonium perchlorate substantially uniformly distributed throughout said polymerized composition.

13. The process of preparing a solid rocket propellant comprising maintaining at a copolymerizing temperature of from about 20° C. to about 90° C. for a period of from about 1 to about 14 hours, 5 parts by weight of a polyamide obtained by reacting an organic acid having from 2 to about 3 carboxy groups and from 2 to about 36 carbon atoms selected from the class consisting of oxalic acid, polycarboxylic aliphatic acids, polycarboxylic acids of benzene, and polycarboxylic acids of lower alkyl benzenes, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkylpolyamines, phenylpolyamines, alkylphenylpolyamines, and substituted ureas having the general formula

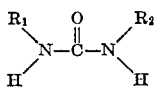

wherein $R_1$ and $R_2$ are selected from the class consisting of hydrogen and hydrocarbon groups having from 1 to about 12 carbon atoms, and wherein the molar ratio of amine-to-acid is from about 3:1 to about 1:1; with from about 1 to about 25 parts by weight of a glycidyl polyether compound obtained by the interaction of an epihalohydrin having from 3 to about 20 carbon atoms, with a polyhydroxy substituted compound having from 2 to about 20 carbon atoms and from 2 to 3 hydroxy groups selected from the class consisting of polyhydroxy aromatic hydrocarbons having from 1 to 2 six-membered carbon rings in the aromatic nucleus, hydroxy phenylalkyl compounds, hydroxy substituted saturated aliphatic hydrocarbons, and hydroxy substituted saturated aliphatic ether compound, said glycidyl polyether compound having a terminal epoxy equivalency of between 1.0 and 2.0; together with from about 100 wt. percent to about 900 wt. percent, based on the weight of said polyamide and said glycidyl polyether, and substantially uniformly distributed therethrough of an inorganic perchlorate having the general formula $$M(ClO_4)_x$$

wherein M is selected from the group consisting of $NH_4$ and a metal of groups I–A, II–A, III–A, IV–A and VIII, and $x$ represents the valency of M.

14. The process of preparing a solid rocket propellant comprising maintaining at a copolymerizing temperature of from about 20° C. to about 90° C. for a period of from about 1 to about 14 hours, 5 parts by weight of a polyamide obtained by reacting dilinoleic acid dimer with 1,3-dimethylurea in amounts such that the molar ratio of urea-to-acid is from about 3:1 to about 1.5:1; with from about 1 to about 25 parts by weight of a glycidyl polyether compound obtained by the interaction of triethyleneglycol with 1,2-epoxy-3-chloropropane in amounts such that the molar ratio of epoxy compound-to-glycol is substantially 2:1; together with from about 100 wt. percent to about 900 wt. percent, based on the weight of said polyamide and said glycidyl polyether, and substantially uniformly distributed therethrough of ammonium perchlorate.

15. The process of preparing a solid rocket propellant comprising maintaining at a copolymerizing temperature of from about 20° C. to about 70° C. for a period of from about 1 to about 14 hours, 5 parts by weight of a polyamide obtained by reacting dilinoleic acid dimer with 1,3-dimethylurea in amounts such that the molar ratio of urea-to-acid is from about 3:1 to about 1.5:1; with from about 1 to about 25 parts by weight of a glycidyl polyether compound obtained by the interaction of triethylene glycol with 1,2-epoxy-3-chloropropane in amounts such that the molar ratio of epoxy compound-to-glycol is substantially 2:1; together with from about 70 wt. percent to about 85 wt. percent, based on the total weight of said propellant composition, of ammonium perchlorate, and from 1 to about 5 weight percent burning catalyst based on the weight of said perchlorate, said perchlorate and said catalyst being substantially uniformly distributed throughout said polyamide and said glycidyl polyether.

16. The process of preparing a solid rocket propellant comprising maintaining at a copolymerizing temperature of from about 20° C. to about 90° C. for a period of from about 1 to about 14 hours, 5 parts by weight of a polyamide obtained by reacting a polycarboxylic aliphatic acid having from 2 to about 3 carboxy groups and 2 to about 26 carbon atoms, with an organic polyamine having from 2 to about 5 nitrogen atoms, from 1 to about 25 carbon atoms, and having at least 1 hydrogen attached to each of at least 2 nitrogen atoms, said amine being selected from the class consisting of alkyl polyamines, phenylpolyamines, alkylphenylpolyamines, and substituted ureas having the general formula

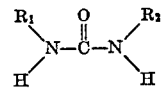

wherein $R_1$ and $R_2$ are selected from the class consisting of hydrogen and hydrocarbon groups having from 1 to about 12 carbon atoms, and wherein the molar ratio of amine-to-acid is from about 3:1 to about 1:1; with from about 1 to about 25 parts by weight of a glycidyl polyether compound obtained by the interaction of 1,2-epoxy-3-chloropropane, with a polyhydroxy substituted saturated aliphatic hydrocarbon containing from 2 to 3 hydroxy groups and from 2 to about 12 carbon atoms, and wherein said glycidyl polyether compound has the terminal epoxy equivalency of between 1.0 and 2.0; together with from about 50 wt. percent to about 90 wt. percent, based on a total weight of said propellant, and substantially uniformly distributed therethrough of an inorganic perchlorate having the general formula $$M(ClO_4)_x$$

wherein M is selected from the group consisting of $NH_4$ and a metal of groups I–A, I–B, II–A, III–A, IV–A and VIII, and $x$ represents the valency of M.

17. The process of preparing a solid rocket propellant comprising maintaining at a copolymerizing temperature of from about 20° C. to about 70° C. for a period of from about 1 to about 14 hours, 5 parts by weight of a polyamide obtained by reacting dilinoleic acid dimer with 1:3 dimethylurea, wherein the molar ratio of urea-to-acid is from about 3:1 to about 1:1; with from about 1 to about 25 parts by weight of a glycidyl polyether compound obtained by the interaction of epichlorohydrin with 1,2,3-trihydroxypropane; together with from about 70 to about 85 wt. percent based on a total weight of said propellant of ammonium perchlorate and from about 1 to about 5 wt. percent based on the weight of said perchlorate of a burning catalyst, said perchlorate and said catalyst being substantially uniformly distributed throughout said polyamide and said glycidyl polyether.

18. The process of preparing a solid rocket propellant comprising maintaining at a copolymerizing temperature of from about 20° C. to about 90° C. for a period of about 1 to about 14 hours, 5 parts by weight of a polyamide obtained by reacting a partially esterified organic acid with a polyamine, said acid having from 2 to about 3 carboxy groups and from 2 to about 36 carbon atoms selected from the class consisting of oxylic acid, polycarboxylic aliphatic acids, polycarboxylic acids of benzene, and polycarboxylic acids of lower alkyl benzenes, said acid being partially esterified with a polyethylene glycol having an average molecular weight of from about 62 to about 400, said polyamine being an organic polyamine having from 2 to about 5 nitrogen atoms, from 1 to about 25 carbon atoms, and having at least 1 hydrogen attached to each of at least 2 nitrogen atoms, said polyamine being selected from the class consisting of alkyl polyamines, phenylpolyamines, alkylphenylpolyamines, and substituted ureas having the general formula

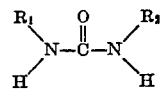

wherein $R_1$ and $R_2$ are selected from the class consisting of hydrogen and hydrocarbon groups having from 1 to about 12 carbon atoms and wherein the molar ratio of amine-to-acid is from about 3:1 to about 1:1; with from 1 to about 25 parts by weight of a glycidyl polyether compound obtained by the interaction of an epihalohydrin having from 3 to about 20 carbon atoms with a polyhydroxy substituted compound having from 2 to about 20 carbon atoms and from 2 to 3 hydroxy groups selected from the class consisting of polyhydroxy aromatic hydrocarbons having from 1 to 2 six-membered carbon rings in the aromatic nucleus, polyhydroxy phenylalkyl compounds, polyhydroxy substituted saturated aliphatic hydrocarbons, and polyhydroxy substituted saturated aliphatic ether compound, said glycidyl polyether compound having a terminal epoxy equivalency of between 1.0 and 2.0; together with from 50 wt. percent to about 90 wt. percent based on a total weight of said propellant and substantially uniformly distributed therethrough of an inorganic perchlorate having the general formula $$M(ClO_4)_x$$

wherein M is selected from the group consisting of $NH_4$ and a metal of groups I–A, II–A, III–A, IV–A and VIII, and $x$ represents the valency of M.

19. The process of preparing a solid rocket propellant comprising maintaining at a copolymerizing temperature of from about 20° C. to about 70° C. for a period of from 1 to about 14 hours, 5 parts by weight of a polyamide obtained by reacting sebacic acid which has been partially esterified with polyethylene glycol having an average molecular weight of 400 and wherein the ratio of sebacic acid to polyethylene glycol in parts by weight is substantially 1:1, with 1:3 dimethylurea wherein the molar ratio of urea-to-acid is from about 3:1 to about 1:1; with from about 1 to about 25 parts by weight of a glycidyl polyether compound obtained by the interaction of epichlorohydrin with triethylene glycol, said glycidyl polyether compound having a terminal expoxy equivalency of between 1.0 and 2.0; together with from about 70 wt. percent to about 85 wt. percent based on the total weight of said propellant of ammonium perchlorate, and from about 1 wt. percent to about 5 wt. percent based on the weight of said perchlorate of a burning catalyst, said perchlorate and said burning catalyst being substantially uniformly distributed throughout said polyamide and said glycidyl polyether.

References Cited in the file of this patent
UNITED STATES PATENTS

| | | |
|---|---|---|
| 2,048,778 | Brubaker et al. | July 28, 1936 |
| 2,071,251 | Carothers | Feb. 16, 1937 |
| 2,479,828 | Geckler | Aug. 23, 1949 |
| 2,740,702 | Mace | Apr. 3, 1956 |